United States Patent [19]
Krettek

[11] Patent Number: 5,091,084
[45] Date of Patent: Feb. 25, 1992

[54] RETAINING SEAL AND SUPPORTING SCREEN SYSTEM FOR DRUM CENTRIFUGE

[75] Inventor: Guntram Krettek, Viersen, Fed. Rep. of Germany

[73] Assignee: Krupp Industrietechnik Gesellschaft Mit Beschrankter Haftung, Duisburg, Fed. Rep. of Germany

[21] Appl. No.: 522,559

[22] Filed: May 14, 1990

[30] Foreign Application Priority Data

May 19, 1989 [DE] Fed. Rep. of Germany ....... 3916383

[51] Int. Cl.$^5$ ............................................. B01D 33/067
[52] U.S. Cl. ................................. 210/232; 210/380.1; 210/402; 210/450; 277/25; 277/184; 277/185; 277/205; 494/38
[58] Field of Search ................. 210/232, 338, 360.1, 210/380.3, 402, 497.01, 450; 494/36, 38; 277/23, 25, 184, 185, 186, 205; 55/502

[56] References Cited

U.S. PATENT DOCUMENTS

| | | | |
|---|---|---|---|
| 1,194,275 | 8/1916 | Christianson | 210/338 |
| 1,581,089 | 4/1926 | Roberts | 210/380.1 |
| 1,946,500 | 1/1933 | Roberts | 494/36 |
| 4,104,169 | 8/1978 | Muller et al. | 210/380.1 |
| 4,269,711 | 5/1981 | Gerteis | 210/232 |
| 4,343,700 | 8/1982 | Daubman et al. | 210/232 |

FOREIGN PATENT DOCUMENTS

| | | | |
|---|---|---|---|
| 830504 | 2/1952 | Fed. Rep. of Germany | 210/450 |
| 1077609 | 3/1960 | Fed. Rep. of Germany | 210/380.1 |
| 1136942 | 9/1962 | Fed. Rep. of Germany | 494/38 |
| 7491 | of 1897 | United Kingdom | 210/380.1 |

Primary Examiner—Robert A. Dawson
Assistant Examiner—Joseph Drodge
Attorney, Agent, or Firm—Herbert Dubno; Andrew Wilford

[57] ABSTRACT

A filter apparatus has a drum rotatable about an axis and having a foraminous outer wall with an inner surface, a support screen lying directly on the inner surface, a filter mesh lying directly on the support screen, and a protective screen lying on the filter mesh and holding same against the support screen. The support screen and mesh are held in place by a retaining seal having at least two lips defining at least one recess snugly receiving the edges of the support screen and mesh with one the lips between the support screen and the drum inner surface. The protective screen lies on the other lip of the seal and presses the seal against the surface of the drum while clamping the edges in the recess.

6 Claims, 2 Drawing Sheets

RETAINING SEAL AND SUPPORTING SCREEN SYSTEM FOR DRUM CENTRIFUGE

FIELD OF THE INVENTION

The present invention relates to a filter-holding system. More particularly this invention concerns such a system used for retaining the filter element in a drum centrifuge.

BACKGROUND OF THE INVENTION

A standard drum centrifuge has a generally cylindrical drum rotatable about and centered on an axis and having a foraminous outer wall with an inner surface, a tubularly cylindrical support screen lying directly on the inner surface, a tubularly cylindrical filter mesh lying directly on the support screen, and a tubularly cylindrical protective screen lying on the filter mesh and holding same against the support screen. The support screen holds the mesh off the drum surface so that the filtrate can collect under the mesh and run out drainage holes in the drum. The protective screen prevents a scraper blade of the type described in commonly owned patent application 07/479,711 filed Feb. 14, 1990 from directly contacting and potentially damaging the relatively fragile mesh.

It is essential to hold the support screen and mesh snugly in place both to prevent the suspension being filtered from getting past them and to keep the mesh flat so it works most efficiently. This retaining system at the same time must permit the filter mesh to be changed with relative ease as under the best of circumstances the filter mesh wears out. Finally the retaining system cannot get in the way of whatever system is used to strip filter cake from the inner surface of the mesh and/or protective screen, as in some systems a 10 mm to 15 mm thick residue is left that greatly reduces filtering efficiency.

In one known arrangement a system of tensioning frame and ring is held in place by a plurality of threaded connectors. The drum is formed with grooves into which the retaining ring fits. Such an arrangement is quite difficult to disassemble and reassemble when the filter mesh must be changed, and does not work in systems where the filter mesh is backflushed to clean it. Furthermore this arrangement is fairly complex and costly.

Another arrangement uses a dovetail-shaped groove in the drum in which the mesh edge is held by an appropriate ring. The drum here is fairly complex and expensive to manufacture, in particular because of the extra wall thickness necessitated by the grooving. In this arrangement also separate retaining devices are needed when the mesh is to be backflushed to keep into in place.

SUMMARY OF THE INVENTION

A filter apparatus according to this invention has a drum rotatable about an axis and having a foraminous outer wall with an inner surface, a support screen lying directly on the inner surface, a filter mesh lying directly on the support screen, and a protective screen lying on the filter mesh and holding same against the support screen. The support screen and mesh are held in place by a retaining seal having at least two lips defining at least one recess snugly receiving the edges of the support screen and mesh with one of the lips between the support screen and the drum inner surface. The protective screen lies on the other lip of the seal and presses the seal against the surface of the drum while clamping the edges in the recess.

Thus with this arrangement the seal ring holds the edges of the support screen and filter mesh snugly and in such a manner that leakage is impossible, while the protective screen in turn holds the seal ring in place. Thus a scraper blade can act directly o the inner surface of the protective screen without any possibility of contact with the filter mesh. The filter cake can therefore be stripped completely from the filter without risking damage to the somewhat delicate filter mesh. The seal ring is an extremely simple element that can be provided at low cost, and the drum used with it can be of simple construction also, thereby reducing the cost of the assembly considerably.

In accordance with this invention the seal has only two such lips forming only one such recess and both edges are together held in the one recess. It is also possible for the seal to have three such lips forming two such recesses in which case the mesh edge is received in one of the recesses and the screen edge in the other recess. The support screen has a flattened edge received in the recess and the seal ring is made of an elastomeric material.

DESCRIPTION OF THE DRAWING

The above and other objects, features, and advantages will become more readily apparent from the following, reference being made to the accompanying drawing in which.

SPECIFIC DESCRIPTION

Figure 1:
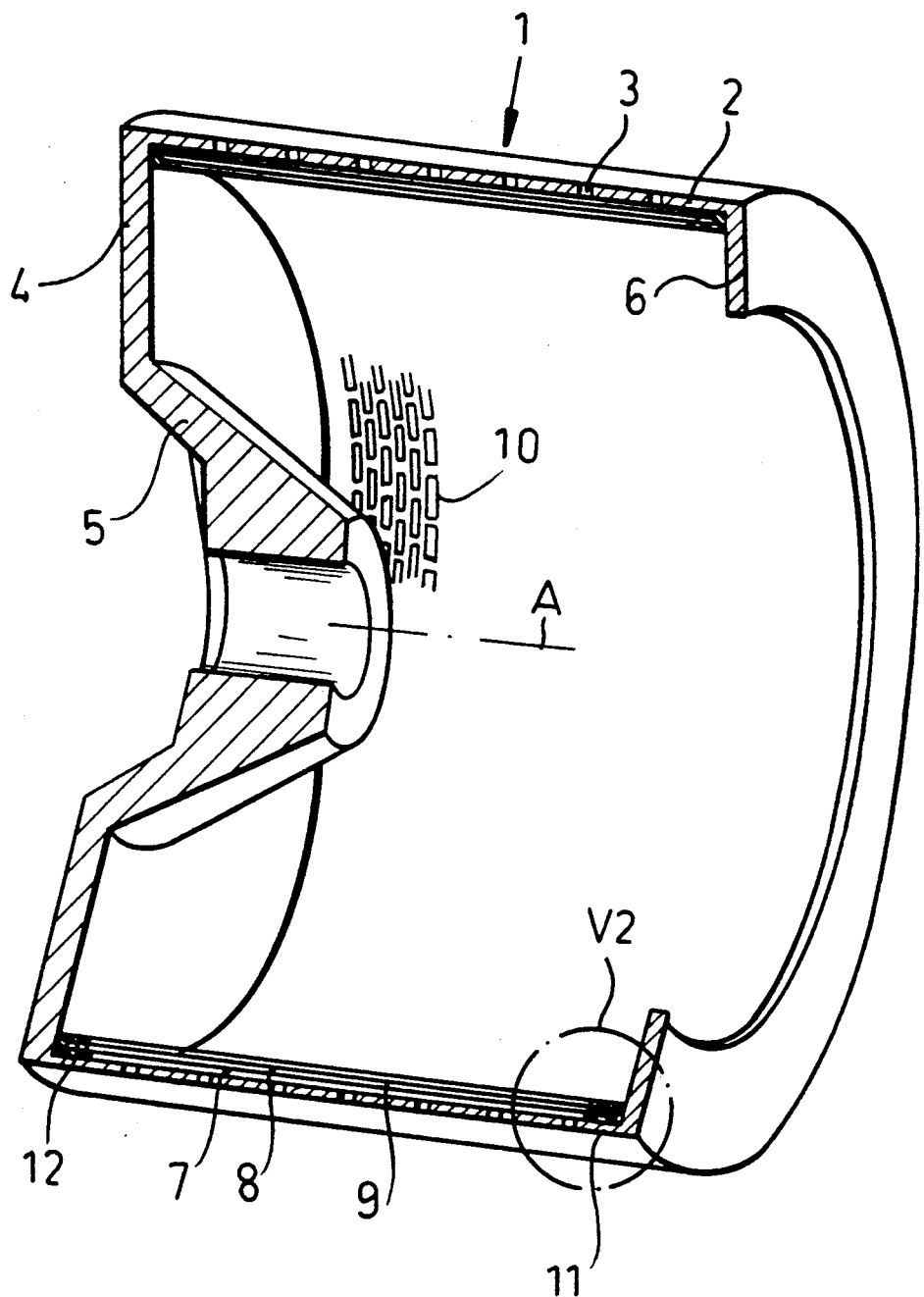
FIG. 1 is a small-scale perspective view partly in axial section through the centrifuge filter according to this invention.

As seen in FIG. 1 a centrifuge filter has a drum 1 centered on a normally horizontal axis A and having a cylindrical outer wall 2 formed with a uniform array of radially throughgoing drain holes 3. One end of the wall 2 is closed by an end wall 4 formed with a hub 5 by means of which it is mounted on a drive shaft of an unillustrated motor and the other end has a radially inwardly projecting short end wall 6 forming an opening through which a suspension to be filtered can be introduced into the drum 1. In addition a s craping system such as described in the above-mentioned commonly owned U.S. Pat. No. application 07/479,711 may project into the drum 1 past the end wall 6.

Lying against the inner surface of the cylindrical outer wall 2 is an outer support screen 7 formed as shown here of wire or expanded metal and of tubular cylindrical shape, extending the full length of the drum 2 from one wall 4 to the other wall 6. Lying in turn on the inner face of this support screen 7 is a porous filter element or mesh 8 that is also of tubular cylindrical shape and that also extends essentially the full length of the drum 2. Radially inside the mesh 8 is a tubular protection screen 9 formed with a multiplicity of radially throughgoing holes or apertures 10. This screen 9 is of the same shape and length as the screen 7 and mesh 8 but, of course, of slightly smaller diameter. It is here shown to be made of sheet metal although it could also be made as a coarse mesh. Any scraper blade such as described in the above-cited patent application can ride directly on the inner surface of this relatively thin screen 9 without touching or damaging the more fragile textile mesh 8.

Figure 2:
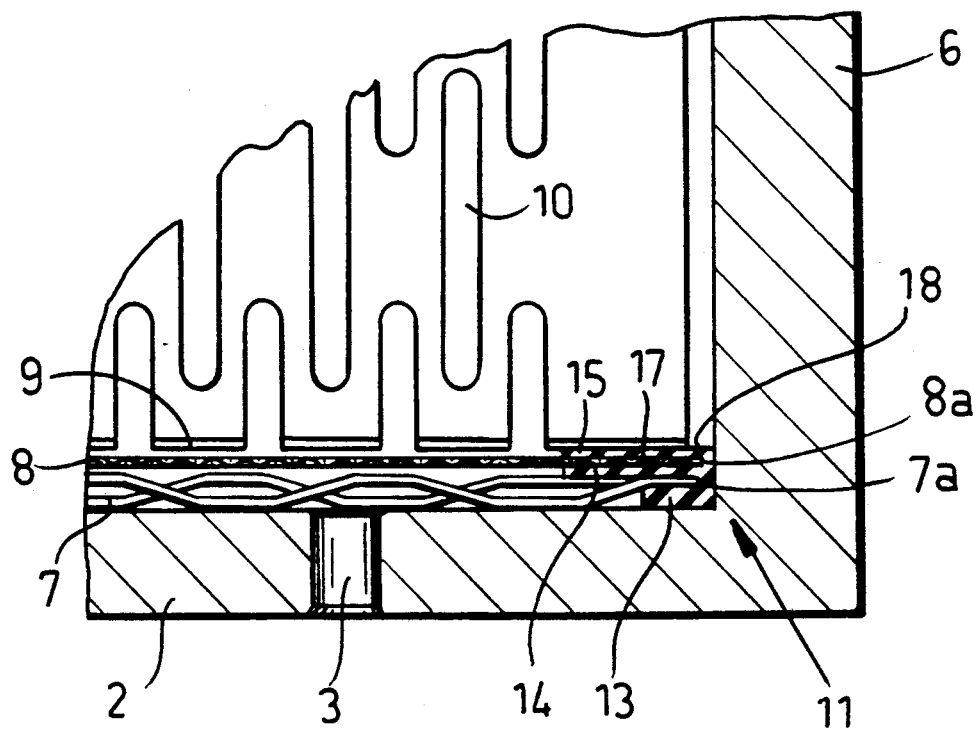
FIG. 2 is a large-scale view of the sectioned detail indicated at V2 in FIG. 1.

Identical W-section retaining seals or rings 11 and 12 are provided at the opposite axial ends of the drum 2. As seen in FIG. 2, the ring 11 has two one short lip 13 and two long lips 14 and 15 forming two grooves 16 and 17 respectively receiving end edges 7a and 8a of the screen 7 and mesh 8. The edge 7a is flattened for best fit. In addition the protective screen 9 lies atop an inner surface 18 defined by the lip 15 of the ring 11 to hold it in place and to clamp the edges 7a and 8a tightly in place.

Figure 3:
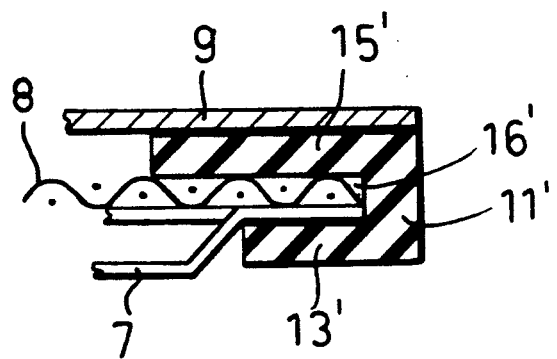
FIG. 3 is a view like FIG. 2 of an alternative system according to this invention.

FIG. 3 shows a J-section retaining ring 11' having a single inner lip 15' on which lies the screen 9 and a single outer lip 13 embracing the end edges of the screen 7 and mesh 8 with the lip 15'.

I claim:

1. In a filter apparatus having:
   a drum rotatable about an axis and having a foraminous outer wall with an inner surface;
   a support screen lying directing on the inner surface;
   a filter mesh lying directly on the support screen; and
   a protective screen lying on the filter mesh and holding same against the support screen; the improvement comprising
   a retaining seal having three lips defining two recesses, the support screen and filter mesh both having edges received in respective ones of the recesses with one of the lips being between the support screen and the drum inner surface, the protective screen lying on another lip of the seal and pressing the seal against the surface of the drum while clamping the edges in the recesses.

2. The improved filter apparatus defined in claim 1 wherein the support screen has a flattened edge received in the respective recess.

3. The improved filter apparatus defined in claim 1 wherein the seal ring is made of an elastomeric material.

4. The improved filter apparatus defined in claim 1 wherein the protective screen bears elastically on the seal ring.

5. In a centrifuge filter having:
   a generally cylindrical drum rotatable about and centered on an axis and having a foraminous outer wall with an inner surface;
   a tubularly cylindrical support screen lying directly on the inner surface;
   a tubularly cylindrical filter mesh lying directly on the support screen; and
   a tubularly cylindrical protective screen lying on the filter mesh and holding same against the support screen; the improvement comprising
   a pair of axially spaced and confronting retaining seals each having at least two lips defining at least one recess, the support screen and filter mesh both having end edges received in the recesses a respective recess with one of the respective lips being between the support screen and the drum inner surface, the protective screen lying on another respectively of the seals and pressing the seals against the surface of the drum while clamping the edges in the respective recesses, another lip of each seal being axially longer than the one lip of the respective seal.

6. In a centrifuge filter having:
   a generally cylindrical drum rotatable about and centered on an axis and having a foraminous outer wall with an inner surface;
   a tubularly cylindrical support screen lying directly on the inner surface;
   a tubularly cylindrical filter mesh lying directly on the support screen; and
   a tubularly cylindrical protective screen lying on the filter mesh and holding same against the support screen; the improvement comprising
   a pair of axially spaced, confronting, W-section, and resilient retaining seals each having an imperforate outer lip, an imperforate middle lip, and an imperforate inner lip defining axially open and radially spaced inner and outer recesses, the support screen having axially opposite end edges received snugly in the outer recesses, the filter mesh having axially opposite end edges received snugly in the inner recesses, the outer lips lying between the support screen and the drum inner surface, the protective screen lying on the inner lips of the seals and pressing the seals against the surface of the drum while clamping the edges in the respective recesses between the respective lips.

* * * * *